No. 698,334. Patented Apr. 22, 1902.
J. D. SMITH.
SPRING SCALE.
(Application filed Aug. 15, 1901.)

(No Model.)

Witnesses:
C. J. Hesler
J. B. Keefer

Inventor
John D. Smith
By James L. Norris
Atty.

THE NORRIS PETERS CO., PHOTO-LITHO., WASHINGTON, D. C.

UNITED STATES PATENT OFFICE.

JOHN D. SMITH, OF BONHAM, TEXAS.

SPRING-SCALE.

SPECIFICATION forming part of Letters Patent No. 698,334, dated April 22, 1902.

Application filed August 15, 1901. Serial No. 72,181. (No model.)

*To all whom it may concern:*

Be it known that I, JOHN D. SMITH, a citizen of the United States, residing at Bonham, in the county of Fannin and State of Texas, have invented new and useful Improvements in Spring-Scales, of which the following is a specification.

The object of my invention is to provide novel means for measuring and indicating the quantity of liquid left in or drawn from a container, the same being primarily intended for use in measuring and indicating at a glance to a bartender the quantity or volume of beer left in a keg or other vessel in which it is contained. The same is, however, adapted to other uses.

The invention consists in certain features and details of construction and combinations of parts, which will be hereinafter more fully described and claimed.

Figure 1:
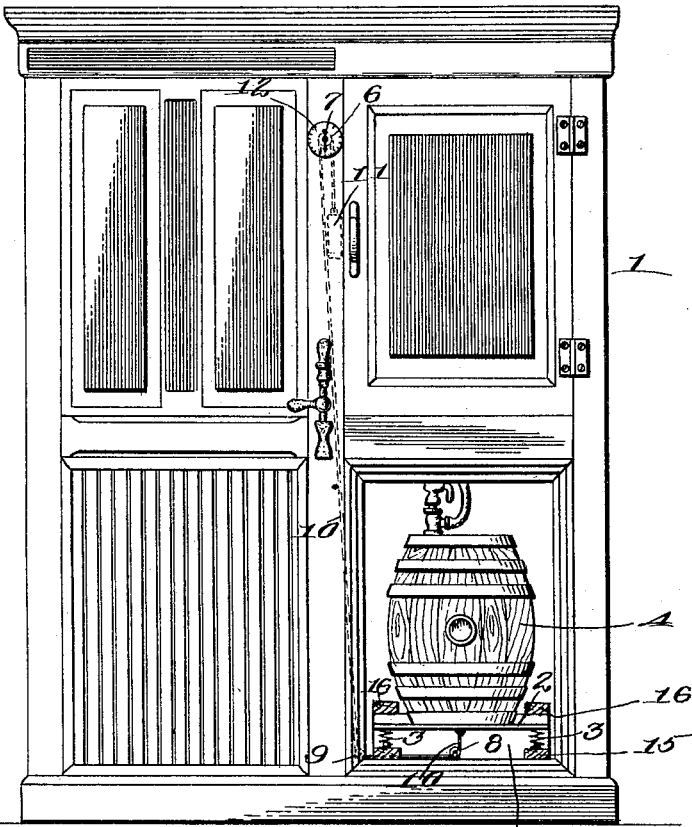
Figure 3:
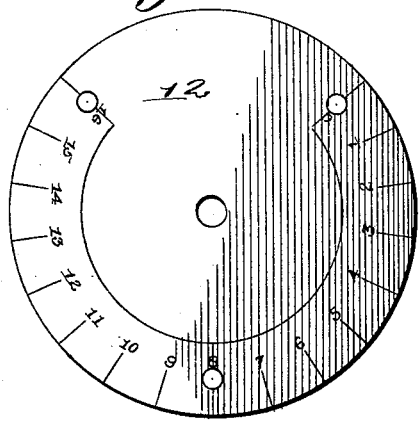
Figure 2:
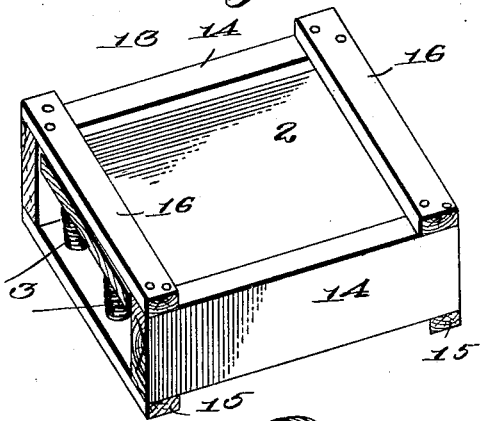
Figure 4:
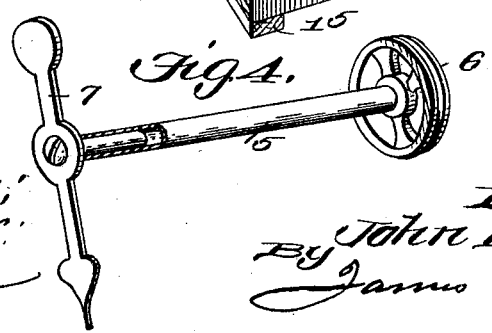

In the drawings forming part of this specification, Figure 1 is an elevation of a beer-chest with my improvements applied thereto. Fig. 2 is a detail perspective view of the spring-supported platform and the frame in which the same is mounted. Fig. 3 is a face view, on an enlarged scale, of the dial. Fig. 4 is a perspective view of the indicating hand or pointer and the shaft to which the same is frictionally secured.

Like reference-numerals indicate like parts in the different views.

Within the beer-chest 1 or other analogous device is located a platform 2, supported upon the springs 3 and designed to sustain a keg 4 of beer or a container of any other kind. Mounted to turn in the wall of the chest 1 is a shaft 5, having a wheel or pulley 6 secured thereto and a hand or pointer 7 frictionally attached to its outer end, so that it may be turned with said shaft, but is capable of independent turning movement thereon. This frictional connection between the hand or pointer 7 and the shaft 5 is made by way of a rearwardly-extending stud or projection on the hand or pointer 7, which fits tightly in the tubular outer end of the shaft 5, as clearly shown in Fig. 4 of the drawings. Attached to the under side of the platform 2 at its central point and passing around a pulley 8, located beneath said platform, and around a pulley 9 at one side of said platform, is a cord, chain, or other analogous connecting device 10, the same extending upwardly from the pulley 9 and passing around the wheel or pulley 6. The said cord or chain has upon its free end a weight 11, which tends to maintain the same taut at all times. The hand or pointer 7 on the end of the shaft 5 projects out beyond the side of the chest 1 and moves in front of a dial 12, provided with graduations indicating gallons or other units of measure.

The platform 2 is mounted within a frame 13, supported upon the floor of the chest 1, the said frame being made up of the front and rear beams 14 and the cross-bars 15 16, the cross-bars 15 being secured to the under side of the beams 14, at the opposite ends thereof, and the cross-bars 16 being secured to the upper sides of the beams 14, at the opposite ends thereof. The springs 3 rest upon the cross-bars 15 and are located beneath the cross-bars 16. Upon these springs the platform 2 is supported, the said platform being located beneath the cross-bars 16. By this construction it will be seen that the platform 2 is maintained in proper position and said platform and the springs 3 are protected from lateral strain.

Now, as heretofore stated, my invention is designed for the purpose of enabling a bartender to see at a glance just what quantity of beer remains in the keg 4, so that he may order in time a fresh keg to take the place of that which has become exhausted. In using the device a full keg 4 of beer is placed upon the platform 2, and the weight of the same will tend to compress the springs 3, on which said platform rests. As the platform 2 is thereby lowered it will slacken the cord or chain 10 between the pulleys 9 and 6, and the weight 11 will turn the shaft 5 and the hand or pointer 7, connected with said shaft, to the right. Before any beer is drawn from the keg 4 the hand or pointer 7 is turned independently of the shaft 5, so that it stands opposite the graduation-mark on the dial 12, which indicates the number of gallons in the keg. For example, if the keg 4 contains a quarter-barrel, or eight gallons, the hand or pointer 7 will be turned to the graduation-mark "8," whereas if it contains a half-barrel, or sixteen gallons, the hand or pointer will be turned to the graduation-mark "16." As the beer is drawn from the keg 4 the platform 2 due to the action of the springs 3 and the decreased weight of the keg 4 and the contents thereof will rise, which action will draw down that portion of the cord or chain 10 between the pulleys 9 and 6. This will turn the shaft 5, to which the wheel or pulley 6 is secured, to the left, and the indicating end of the hand or pointer will move in front of the face of the dial from left to right. When, therefore, the hand or pointer 7 reaches the zero-mark on the dial 12, it will show that the keg is empty, and at all times it will show the quantity of beer left in the keg. Of course when larger kegs or vats are to be used it is merely necessary to increase the strength of the springs 3 and to provide a greater number of graduations on the dial 12. By having the hand or pointer 7 frictionally secured to the shaft 5, so that it may be turned independently of said shaft, it will be seen that as said hand or pointer is turned to the graduation-mark on the dial 12, which indicates the number of gallons contained in the keg before any beer is drawn off from said keg, the weight of said keg has no effect whatever upon the indicating mechanism, the only thing taken into consideration by the apparatus being the beer or other liquid which is withdrawn from said keg.

Having now described my invention, what I claim as new, and desire to secure by Letters Patent, is—

The combination with indicating mechanism, a vertically-movable platform for sustaining a containing vessel, and operative connections between said platform and said indicating mechanism, of a frame in which said platform is mounted, the same comprising a pair of longitudinal beams, cross-bars arranged in pairs secured, respectively, to the upper and lower sides of said beams at opposite ends thereof, and springs resting upon the lower of said cross-bars, the said platform being located beneath the upper of said cross-bars and supported upon said springs, as and for the purpose set forth.

In testimony whereof I have hereunto set my hand in presence of two subscribing witnesses.

JOHN D. SMITH.

Witnesses:
CHAS. G. NUNN,
J. W. TAYLOR.